US006162979A

United States Patent [19]

Gauger

[11] Patent Number: 6,162,979

[45] **Date of Patent: *Dec. 19, 2000**

[54] ADJUSTABLE SPRING BRUSH

[76] Inventor: Gary L. Gauger, 15108 Highland La., Minnetonka, Minn. 56345

[ * ] Notice: This patent issued on a continued prosecution application filed under 37 CFR 1.53(d), and is subject to the twenty year patent term provisions of 35 U.S.C. 154(a)(2).

[21] Appl. No.: 09/348,391

[22] Filed: Jul. 7, 1999

Related U.S. Application Data

[60] Provisional application No. 60/091,879, Jul. 7, 1998.

[51] Int. Cl.[7] ..................................................... G01D 13/02

[52] U.S. Cl. ........................... 84/422.4; 84/422.1; 84/402

[58] Field of Search ................................ 84/422.1, 422.2, 84/422.4, 102, 402

[56] References Cited

U.S. PATENT DOCUMENTS

| | | | |
|---|---|---|---|
| 3,150,555 | 9/1964 | Sage . | |
| 3,420,134 | 1/1969 | Cordes . | |
| 4,028,983 | 6/1977 | Calato . | |
| 4,200,026 | 4/1980 | Phreaner . | |
| 4,535,671 | 8/1985 | Stromberg . | |
| 4,559,860 | 12/1985 | Cordes . | |
| 4,559,868 | 12/1985 | Cordes | 84/422.4 |
| 5,728,958 | 3/1998 | Vater . | |
| 6,002,077 | 12/1999 | Nicolosi | 84/422.4 |

OTHER PUBLICATIONS

Interstate Drums and Percussion Catalog, p. 24.
Drums, Etc., (catalog)p. 50.
Explorers Percussion, (catalog) p. 40.
Interstate Drums and Percussion Catalog, p. 23.
Interstate Drums and Percussion Catalog, p. 25.
Interstate Drums and Percussion Catalog, p. 27.
Unigrip 2000, 1646 N. Lincoln St., Burbank, CA 91506.
Zildjian (catalog).
VeriSonic products brochure.

*Primary Examiner*—Robert E. Nappi
*Assistant Examiner*—Shih-yung Hsieh
*Attorney, Agent, or Firm*—Moore & Hansen

[57] ABSTRACT

An adjustable drum beater for playing a percussion device is herein disclosed. The drum beater comprises a handle in which is engaged a threaded ferrule that has attached thereto a brush for striking a percussion device such as a drum. The handle has a longitudinal cavity formed therethrough that is sized to receive the brush. The cavity also has interior threads that reversibly engage the ferrule. By reversing the ferrule in the interior threads of the cavity, the brush may be stored in the handle of the drum beater. A coil spring is positioned circumjacent to the brush and is longitudinally moveable along the brush to modify the sound created by the brush.

28 Claims, 2 Drawing Sheets

ADJUSTABLE SPRING BRUSH

This application claims benefit of provisional application 60/091,879 Jul. 7, 1998.

BACKGROUND OF THE INVENTION

The present invention is drawn to a beater for playing a percussion device such as a drum that may be modified by a percussionist to produce different sounds.

One of the most important aspects of any percussion instrument is the device or beater, that strikes the percussion instrument to produce the sound. In the past, beaters such as drum brushes were developed primarily for use on drums with calfskin heads. However, in general, it can be said that drum brushes of the prior art failed to produce a sufficiently loud and bright sound when striking a percussion instrument and were, in addition, limited in the manner in which they could be adjusted. Furthermore, the balance of drum brushes of the prior art typically changed when the brushes were adjusted to produce different sounds. Another drawback to drum brushes of the prior art is that they were very susceptible of damage due to improper storage or handling.

In light of the shortcomings of prior art drum brushes listed above, it is the objective of the present invention to provide a fully adjustable drum brush or beater that has the same balance regardless of how the beater has been adjusted. In addition, it is an objective of this invention to provide a beater that is self storing and therefore less susceptible to damage during transportation. Another objective of the present invention is to provide a beater having a handle with which a percussionist may use a number of different percussion accessories, including, among others, a brush, a rigid rod, or a flexible rod.

SUMMARY OF THE INVENTION

An adjustable drum brush constructed according to the present invention comprises a wire bundle that has a base end and a free end. The base end of the bundle is secured to a ferrule having a threaded portion with longitudinal projections extending from either side thereof. The base end of the wire bundle is secured to one of the projections of the ferrule. The handle of the drum brush has a longitudinal cavity accessible at one end thereof which is sized to receive the entire wire bundle. In order to secure the wire bundle to the handle, interior threads are formed in the cavity of the handle to engage the threaded portion of the ferrule. The ferrule may be secured to the handle in a first, operative position in which the wire bundle extends away from the handle or in a second, storage position in which the wire bundle is received with the cavity of the handle.

The wire bundle of the drum brush is preferably made up of a plurality of helical wires secured to the ferrule but may also be made up of straight wires. The helical wires of the wire bundle may be arranged such that the individual helices of the wires form a continuous helical thread or channel around the wire bundle. In order to adjust the sound created by the drum brush described above, a coil spring is positioned circumjacent to the wire bundle and longitudinally moveable thereupon. The coil spring may also be at least partially threadedly engaged with the helical thread formed around the wire bundle to aid in the adjustment of the sound of the drum brush.

Percussion accessories other than wire bundles may also be secured to a ferrule such as the one described above. Examples include rigid or flexible rods or varying shape and density.

A collet-type ferrule comprising an exterior end or body and a threaded end or sleeve continuous therewith and having a bore extending entirely therethrough may be used in place of the preferred ferrule described above. The bore of this alternative embodiment is arranged to slidably receive a suitable percussion accessory therein. The threaded end of the collet-type ferrule is radially compressible or deflectable so as to partially occlude the bore and by compression retain a percussion accessory in a predetermined position in the collet-type ferrule. As the percussion accessories are not directly attached to the collet-type ferrule, a percussion accessory like the wire bundle described above must have all of the wires forming the bundle independently connected or bound to remain together.

A collet-type ferrule is moveable between a first, open position in which a percussion accessory may freely slide through the ferrule between fully extended and a fully retracted positions, and a second, closed position in which the threaded end of the collet-type ferrule compresses the percussion accessory to securely retain the percussion accessory in the predetermined position.

Where it is so desired, a simplified adjustable drum beater may simply comprise a bundle of helical wires arranged such that the individual helices of the helical wires form a continuous helical thread about the outer surface of the bundle. Such a bundle has a free end for striking a percussion device and a base end that is secured to an elongate handle. A coil spring is positioned circumjacent to the bundle of helical wires and is longitudinally moveable thereon. It may be desirable in such a simplified adjustable drum beater to arrange the coil spring so that the coil spring at least partially threadedly engages the helical thread formed about the outer surface of the bundle of wires.

DETAILED DESCRIPTION OF THE INVENTION

Figure 1:
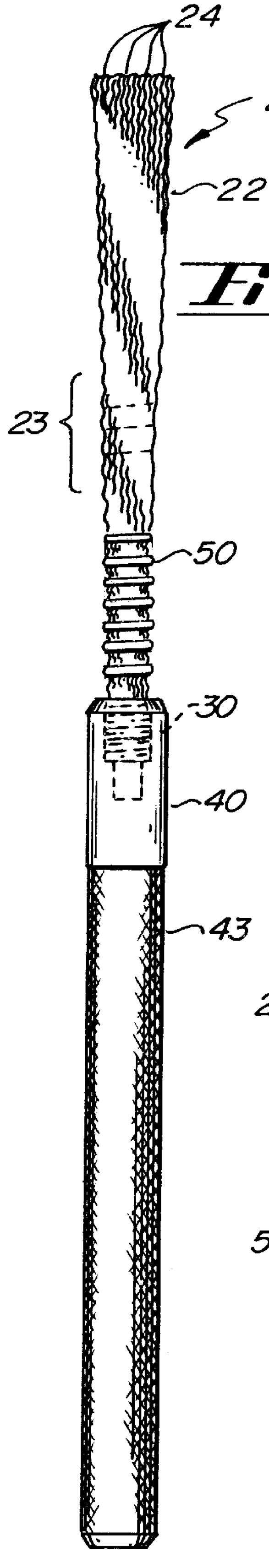
FIG. 1 illustrates a spring brush constructed according to the present invention arranged for playing a drum.

FIG. 1 illustrates a beater 10 constructed according to the present invention assembled and ready for play. The beater 10 is comprised of a percussion accessory 20 mounted to a handle 40 by means of a threaded ferrule 30. The beater 10 depicted in FIG. 1 is configured as a drum brush and therefore has a wire bundle 22 secured to the threaded ferrule 30. The wires 24 which comprise the wire bundle 22 are preferably helically coiled wires that are made by stretching or drawing out springs. Such wires 24, incidentally, are also used to form the snares that are secured to the lower head of a drum to produce the "snare" effect or sound. Alternatively, straight wires or flexible filaments may also be used to form a suitable bundle 22.

Figure 6:
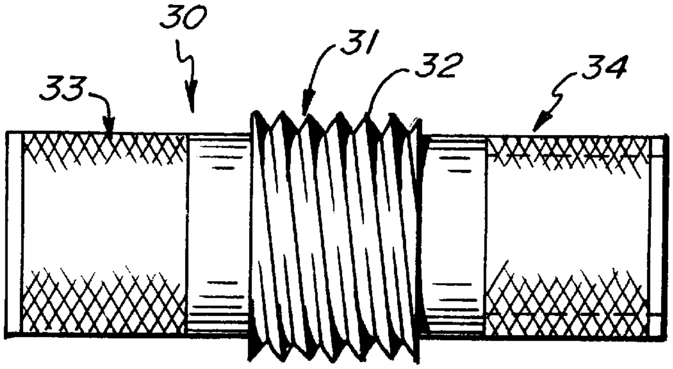
FIG. 6 is an elevation of the preferred embodiment of the ferrule.

The threaded ferrule 30 which secures the wire bundle 22 to the handle 40 is more clearly illustrated in FIG. 6. The ferrule 30 is generally cylindrical in shape and has a central portion 31 with threads 32 formed thereon. Ferrule 30 also has two projections 33, 34 which extend longitudinally from the central portion 31. The ferrule 30 may be made of metal, plastic, or even wood, however, it is preferred to fabricate the ferrule from a metal such as aluminum.

Projection 34 has a bore 35 formed therein for securing a percussion accessory 20 such as a wire bundle 22 to the ferrule 30. In the preferred embodiment illustrated in FIGS. 1–6, a wire bundle 22 is glued into the bore 35 of the ferrule 30. In order to increase the shear strength of the glue bond between the wire bundle 22 and the ferrule 30, it is preferable to roughen the surface of the bore 35 as by forming threads in the bore 35. It is also contemplated that the wires 24 may be secured to the ferrule 30 as by welding where the wires 24 and ferrule 30 are metal or by means of a plug or other securing means. Since the percussion accessory 20 and ferrule 30 are separate from the handle, these can be sold or replaced individually.

The handle 40 is an elongate cylindrical rod having roughly the same diameter and weight as a drumstick. The handle 40 may be made from metal, plastic or wood though it is preferred to utilize a plastic material marketed under the trademark DELRIN™. Preferably the surface of the handle 40 is provided with a texture, such as by knurling, or is coated with a material 43 to prevent the handle 40 from flying out of the hands of a musician during drum play. The preferred embodiment of the present invention uses an over-molded rubberized material to prevent slippage during drum play.

Figure 2:
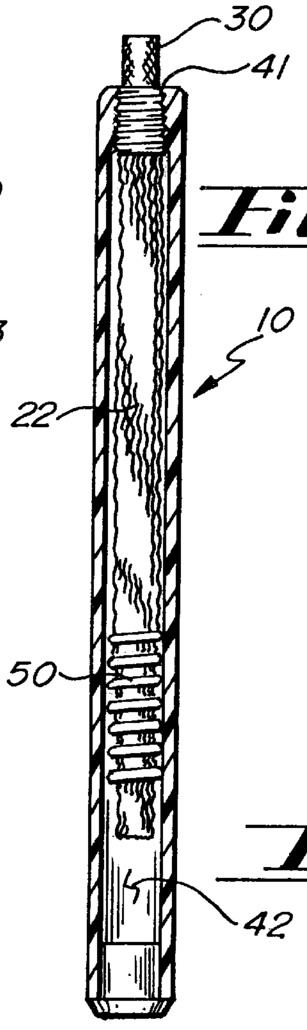
FIG. 2 illustrates the spring brush of FIG. 1 in its storage configuration, the wires of the brush being stored inside the handle.
Figure 5:
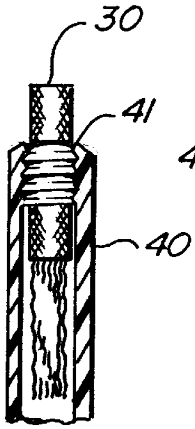
FIG. 5 is a partial cut away view of the ferrule received within the handle of the drum brush.

The threads 32 of the ferrule 30 are arranged to mate with a threaded aperture 41 in the end of the handle 40 as is illustrated in FIGS. 2 and 5. The threads that are formed in the aperture 41 of the handle are pipe threads that allow the ferrule 30 to rotate into the handle 40 only to a certain depth before stopping. Ferrule threads 32 are arranged to be reversible in that the threads 32 will engage the threaded aperture 41 of the handle 40 regardless of which projection 33, 34 is presented first. In this manner the wire bundle 22 may be stored in a longitudinal cavity 42 formed in the handle 40. This cavity 42 is sized so as to be deeper than the length of the wire bundle 22 or other percussion accessory 20 that is being used with the beater 10. Without the pipe thread arrangement of the threads of the aperture 41, there exists the possibility that the ferrule 30 and percussion accessory 20 would slip into the cavity 42 of the handle 40 thereby rendering the beater 10 unusable.

In the first, operative configuration illustrated in FIG. 1, the ferrule 30 is threaded into the handle 40 with projection 33 inserted into the cavity 42 and the wire bundle 22 extending away from the handle 40. In the second, storage configuration illustrated in FIG. 2, the ferrule 30 is threaded into the handle 40 with projection 34 and the wire bundle 22 inserted into the cavity 42 and projection 33 extending away from the handle 40. Preferably, each of the projections 33, 34 are provided with a roughened surface to aid in gripping the ferrule 30. It is also possible that the ferrule 30 may be engaged in the handle 40 using a cam lock arrangement or even a friction fit.

As indicated above it is preferable to utilize helical wires 24 in forming the wire bundle 22. However, it must be understood that straight wires may also be used. What is more, the wires 24 may be arranged in a fan, the bundle 22 may be beveled at its free end 26, or the lengths of individual wires 24 may be varied to present a more ragged pattern. Likewise, other percussion accessories 20, such as rigid rods, strips of plastic or wood, or flexible filaments, may be used in lieu of the preferred helical wires 24.

As can be seen more clearly in FIG. 1, the preferred helical wires 24 are bundled so that the helices of each wire 24 will interlock with the helices of the remaining wires 24 to create a helical thread 23 running from the base 25 of the grouped wire bundle 22 to the free end 26 of the bundle 22. The amount of interlock between the wires 24 is controlled by a coil spring 50 positioned circumjacent to the bundle of wires 22, i.e. wrapped around the bundle 22. The diameter of the coil spring 50 should be slightly larger than that of the wire bundle 22 but should also be sized so that the coil spring 50 will fit fairly snugly around the bundle 22 to prevent the coil spring 50 from moving due to the impact of the beater 10 upon a chosen percussion device. The coil spring 50 can be adjusted or moved longitudinally from the base 25 of the bundle 22 out toward the free end 26 of the bundle 22. The coil spring 50, when positioned at the base 25 of the bundle 22, allows the wires 24 to flex, flair, or fan out to a greater degree when striking the surface of a percussion device such as a drum or cymbal. This creates a softer sound versus the more centered or pointed stick-like sound created when the coil spring 50 is moved toward the free end 26 of the bundle 22. A desired sound may be achieved by varying the location of the coil spring 50 upon the bundle 22.

The coil spring 50 preferably has the same pitch as the helical thread 23 formed about the outer surface of the bundle of wires 22. However, the pitch of the coil spring 50 need not be complementary to the pitch of the helical thread 23 on the bundle 22 and a partial threaded engagement between the coil spring 50 and the helical thread 23 of the bundle 22 is sufficient. Accordingly, a percussionist will adjust the sound produced by the beater 10 striking a percussion device by rotating the coil spring 50 around the helical thread 23 with a screw type motion (out or in) on the bundle of wires 22.

The wire used to fabricate the helical wires 24 of the preferred embodiment is chrome plated steel. This serves two important functions not yet found on any previous patents for brush type percussion accessories 20. First, the chrome plating hardens standard steel wire by coating it with nickel chrome. This helps in producing a brighter, sharper sound on the drum head or cymbals. This is especially true on today's synthetic drum heads which have a much smoother playing surface than the rough, inconsistent calfskin that was the mainstay of the industry until the early 1960s. Calfskin actually became rougher and more resonant with use, whereas plastic or Mylar™ becomes smoother with less ability to produce an acceptable brush sound using conventional brushes. The brush sound is created by sliding a drum brush across the drum head. This brush sound may only be accomplished through the use of a brush. Secondly, the plating provides a surface that is rust and oxide free. Without this, the oxides that form on regular wire can transfer to the drum head and also to the player's hands.

Figure 3:
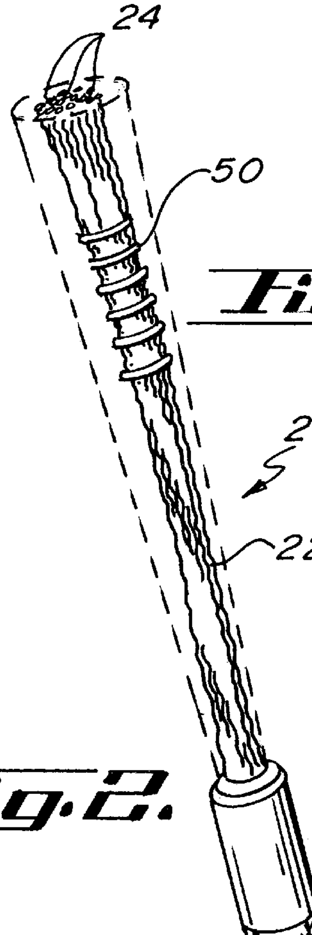
FIG. 3 illustrates the spring brush of FIG. 1 with the adjusting spring located near the free end of the wires to form a more solid bundle.
Figure 3:
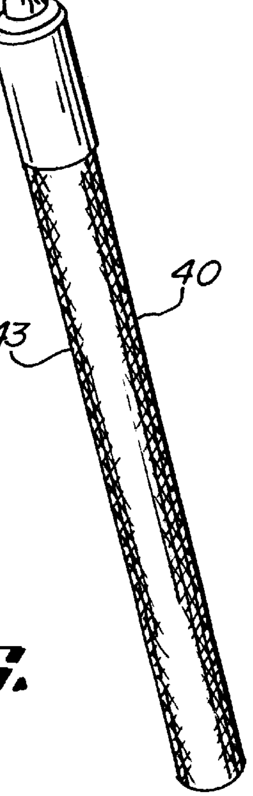
Figure 4:
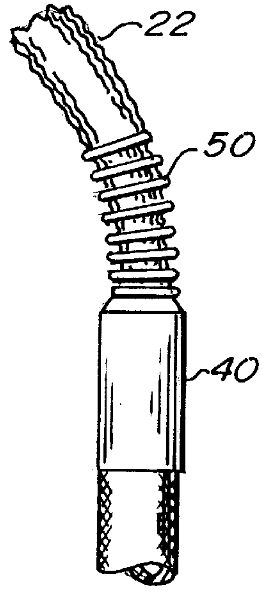
FIG. 4 is a close up view of the adjusting spring when it is located at the base of the wires forming the brush.

FIG. 4 shows an additional advantage of the adjusting spring 50. Moving the spring 50 to the base 25 of the bundle 22 where the wires 24 are anchored to the ferrule 30 reinforces the wires 24 at their greatest stress point and helps prevent breaking or permanent bending under heavy playing. FIG. 3 shows the wires 24 in a more closed or bundled position accomplished by extending the spring 50 towards the free end 26 of the bundle 22. This is also the position of the spring 50 when storing the bundle 22 in the handle 40. This storage position can be seen in FIG. 2 with the spring 50 still attached at the end of the wires 24 inside the handle 40. The spring 50 should not be removed for storing.

Figure 7:
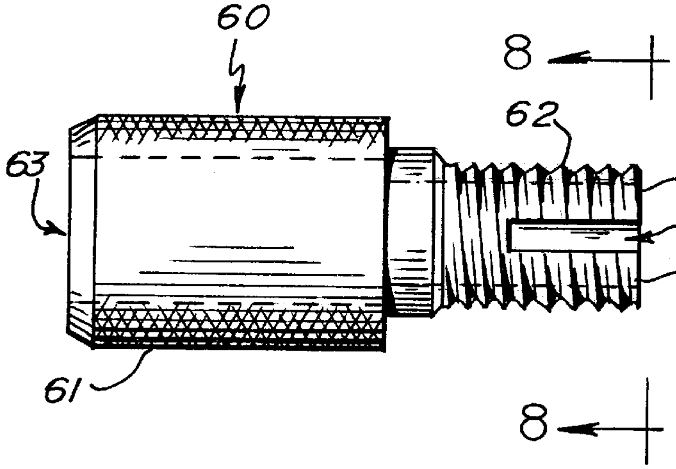
FIG. 7 is an elevation of a collet type ferrule.
Figure 8:
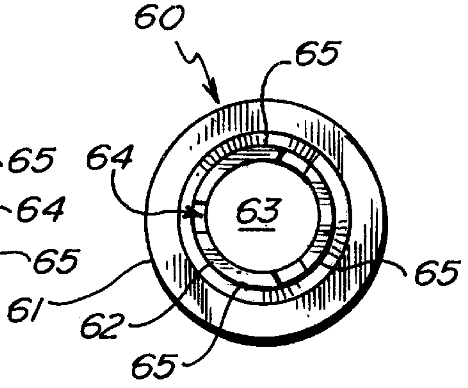
FIG. 8 is an end view of a collet type ferrule.

An alternate embodiment of a ferrule is illustrated in FIGS. 7 and 8. The ferrule of FIGS. 7 and 8 is essentially a collet 60 having knurled body 61 with a threaded sleeve 62 extending rearwardly from the body 61. The collet 60 has a bore 63 running longitudinally through the body 61 and sleeve 62 thereof. A percussion accessory 20, such as a wire bundle 22 or a rigid or flexible rod, may be inserted through, and be freely slidable within, the bore 63 in the collet 60.

The threads of the sleeve 62 are arranged to engage the threads of the aperture 41 of handle 40. As the collet 60 is screwed into the aperture 41 of the handle 40, the sleeve 62 is radially inwardly deflected. This inward deflection is facilitated by forming slots 64 in the sleeve 62. When the collet 60 is moved to its inward, closed position, the walls of the handle 40 force the legs or tongues 65 formed by slots 64 to press against a percussion accessory 20 received through the bore 63 of the collet 60. This pressure secures the accessory 20 in the predetermined position chosen by the percussionist. Backing off the collet 60 to its outward, open position, allows the sleeve 62 to relax and returns the bore 63 to its original diameter, thereby allowing the percussion accessory 20 to move freely through the bore 63. To adjust the length of the percussion accessory 20 or to store the percussion accessory 20 in the handle 40 for transport, the collet 60 is moved to is outward, open position and the percussion accessory is slid to its desired location. The collet 60 is then screwed down to its inward, closed position to secure the percussion accessory 20 in this desired location.

Where the percussion accessory 20 used with the collet 60 is a wire bundle 22, the wires 24 of the wire bundle 22 must be independently secured at the base 25 of the bundle 22 as by welding, soldering, or gluing the wires 24 to one another or to a plug (not shown) having a diameter smaller than that of the bore 63. The wire bundle 22 may be inserted through the bore 63 and will be free to slide therethrough while the collet 60 is in its open position. Similarly, when the collet 60 is in its closed position, the tongues 65 of the sleeve 62 will compress the bundle 22 to secure it in a predetermined position selected by the user of the beater 10. Preferably, that portion of the bore 63 extending through body 61 of the collet 60 will have a diameter large enough to receive an adjusting coil spring 50 between the body 61 of the collet 60 and the wire bundle 22. In this manner the adjusting spring 50 may be placed much closer to the base 25 of the bundle 22, therefore giving the beater 10 a greater range of sounds.

This description is intended to provide specific examples of preferred and alternative embodiments which clearly disclose the principles of the present invention. Accordingly, the present invention is not to be limited to just these described embodiments or to the use of the specific elements described herein. All alternative modifications and variations of the present invention which fall within the spirit and broad scope of the appended claims are covered.

What is claimed is:

1. An adjustable drum brush for playing a percussion device comprising:

a wire bundle having a free end for striking the percussion device and a base end;

a ferrule having a threaded portion with longitudinal projections extending from either side of the threaded portion, the base end of the wire bundle being secured to one of the projections of the ferrule;

a handle having a longitudinal cavity accessible at one end of the handle, the cavity being sized to receive the wire bundle, the cavity being further provided with interior threads arranged to threadedly engage the threaded portion of the ferrule in a first, operative position in which the wire bundle extends away from the handle and a second, storage position in which the wire bundle is received within the cavity of the handle.

2. The adjustable drum brush of claim 1 further comprising a coil spring positioned circumjacent to the wire bundle and longitudinally moveable thereupon.

3. The adjustable drum brush of claim 1 wherein the wire bundle is made up of a plurality of helical wires.

4. The adjustable drum brush of claim 3 wherein the helical wires of the wire bundle are arranged such that the individual helices of the wires form a continuous helical thread around the wire bundle.

5. The adjustable drum brush of claim 4 further comprising a coil spring positioned circumjacent to the wire bundle and longitudinally moveable thereupon, the coil spring at least partially threadedly engaging the helical thread formed around the wire bundle.

6. The adjustable drum brush of claim 1 wherein the wire bundle is made up of a plurality of straight wires.

7. An adjustable drum beater for playing a percussion device comprising:

a percussion accessory having a free end for striking the percussion device and a base end;

a ferrule having a threaded portion with longitudinal projections extending from either side of the threaded portion, the base end of the percussion accessory being secured to one of the projections of the ferrule;

a handle having a longitudinal cavity accessible at one end of the handle, the cavity being sized to receive the percussion accessory, the cavity being further provided with interior threads arranged to threadedly engage the ferrule in a first, operative position in which the percussion accessory extends away from the handle and a second, storage position in which the percussion accessory is received within the cavity of the handle.

8. The adjustable drum beater of claim 7 wherein the percussion accessory is a wire bundle.

9. The adjustable drum beater of claim 8 wherein the wire bundle is made up of a plurality of helical wires.

10. The adjustable drum beater of claim 9 wherein the helical wires of the wire bundle are arranged such that the individual helices of the wires form a continuous helical thread around the wire bundle.

11. The adjustable drum beater of claim 10 further comprising a coil spring positioned circumjacent to the wire bundle and longitudinally moveable thereupon, the spring at least partially threadedly engaging the helical thread formed around the wire bundle.

12. The adjustable drum beater of claim 8 wherein the wire bundle is made up of a plurality of straight wires.

13. The adjustable drum beater of claim 12 further comprising a coil spring positioned circumjacent to the wire bundle and longitudinally moveable thereupon.

14. The adjustable drum beater of claim 7 wherein the percussion accessory comprises a rigid rod.

15. The adjustable drum beater of claim 7 wherein the percussion accessory comprises a flexible rod.

16. An adjustable drum beater for playing a percussion device comprising:

a percussion accessory having a free end for striking the percussion device and a base end;

a ferrule having an exterior end and a threaded end and a bore extending entirely therethrough, the bore being arranged to slidably receive the percussion accessory therethrough, the threaded end of the ferrule being radially compressible so as to partially occlude the bore and thereby retain the percussion accessory in a predetermined position in the ferrule; and, a handle having a longitudinal cavity accessible at one end of the handle, the cavity being sized to receive the percussion accessory with the base end of the percussion accessory being received in the cavity in the handle, the cavity being further provided with interior threads arranged to threadedly engage the threaded end of the ferrule in a first, open position in which the percussion accessory may freely slide through the ferrule between a fully extended position and a fully retracted position, and a second, closed position in which the threaded end of the ferrule impinges upon the percussion accessory to securely retain the percussion accessory in a predetermined position.

17. The adjustable drum beater of claim 16 wherein the percussion accessory is a bundle of wires, the wires being securely connected to one another at the base end of the bundle.

18. The adjustable drum beater of claim 17 wherein the wire bundle is made up of a plurality of helical wires.

19. The adjustable drum beater of claim 18 wherein the helical wires of the wire bundle are arranged such that the individual helices of the wires form a continuous helical thread around the wire bundle.

20. The adjustable drum beater of claim 19 further comprising a coil spring positioned circumjacent to the wire bundle and longitudinally moveable thereupon, the spring at least partially threadedly engaging the helical thread formed around the wire bundle.

21. The adjustable drum beater of claim 16 wherein the wire bundle is made up of a plurality of straight wires.

22. The adjustable drum beater of claim 21 further comprising a coil spring positioned circumjacent to the wire bundle and longitudinally moveable thereupon.

23. The adjustable drum beater of claim 16 wherein the percussion accessory comprises a rigid rod.

24. The adjustable drum beater of claim 16 wherein the percussion accessory comprises a flexible rod.

25. The adjustable drum beater of claim 16 wherein the threaded end of the ferrule is slotted to form plurality of longitudinal legs which are radially deflectable.

26. An adjustable drum beater for playing a percussion device comprising:

a handle having a longitudinal cavity formed therein, the cavity opening at an end of the handle and sized to receive a brush which is comprised of a bundle of wires, the cavity also having interior threads formed adjacent the opening in the handle end;

a ferrule having a threaded portion arranged and constructed to be reversibly and threadedly received in the opening of the cavity and first and second projections extending longitudinally from either side of the threaded portion, one of the projections having a bore formed therein so as to secure to the ferrule a base end of the brush, a free end of the brush being used to strike the percussion device; and a coil spring positioned circumjacent to the wire bundle of the brush and longitudinally moveable along the wire bundle of the brush.

27. An adjustable drum beater for playing a percussion device comprising:

a bundle of helical wires arranged such that the individual helices of the helical wires form a continuous helical thread about the outer surface of the bundle of wires, the bundle having a free end for striking the percussion device and a base end that is secured to an elongate handle; and a coil spring positioned circumjacent to the bundle of helical wires and longitudinally moveable thereon.

28. The adjustable drum beater of claim 27 wherein the coil spring at least partially threadedly engages the helical thread formed about the outer surface of the bundle of wires.

* * * * *